Aug. 11, 1970   H. A. McMASTER   3,523,776
METHOD AND APPARATUS FOR MANUFACTURING SHEET GLASS
Filed March 15, 1967   2 Sheets-Sheet 2

INVENTOR.
Harold A. McMaster
BY
Barnard, McGlynn & Reising
ATTORNEYS

United States Patent Office 3,523,776
Patented Aug. 11, 1970

3,523,776
METHOD AND APPARATUS FOR
MANUFACTURING SHEET GLASS
Harold A. McMaster, Woodville, Ohio, assignor to Permaglass, Inc., Millbury, Ohio, a corporation of Ohio
Filed Mar. 15, 1967, Ser. No. 623,367
Int. Cl. G03b 15/04, 13/04
U.S. Cl. 65—25                                    19 Claims

ABSTRACT OF THE DISCLOSURE

Method and apparatus for forming glass sheet by rotating spaced rolls which are partially immersed in a molten glass bath to move molten glass into a rounded elongated body, of bulbous cross section, above the rolls where the surface is fire polished, the sheet being drawn from this elongated body. The rolls are of a material which the molten glass will not wet. The drawn sheet is of high optical quality in that it has uniform thickness and smooth surfaces. The drawn sheet is preferably floated on a gaseous support bed and cooled as it approaches rollers which draw the sheet from the elongated body.

---

The subject matter of the present invention is a new sheet glass manufacturing method and apparatus which enables the commercial production of glass sheet of greatly improved optical quality and yet at a low cost as compared to the manufacture of lower quality glass sheet by the conventional drawing techniques in current use.

There are two basic methods presently used for the manufacture of glass sheet. The most recent of these two basic methods, at least from the standpoint of widespread commercial usage, is the so-called float system wherein the glass sheet is formed by floating molten glass on liquid metal. Glass sheet of excellent optical quality can be manufactured in this manner; however, the method has some serious disadvantages, chief of which is high cost. It is generally accepted that the float system can be used to produce glass sheet of an optical quality intermediate that of conventional drawn sheet and plate glass but at a cost which is also intermediate and therefore considerably higher than that required to manufacture conventional drawn sheet. Also, the float system imposes limitations on the glass composition and the optimum advantages of the system are only attainable in the manufacture of glass sheet of a certain thickness as determined by the surface tension of the molten glass.

The other basic system, which is and has for many years been in common use, is that of drawing the glass sheet from a mass of molten glass. There are three conventional methods of this basic system. One is commonly referred to as the Fourcault method and is characterized in that in forming the sheet, the molten glass is drawn upward through an elongated slot in a refractory block, generally referred to as the debiteuse. A short vertical lehr is normally positioned above the debiteuse for roughly annealing the drawn sheet. The second of these conventional methods is commonly referred to as the Colburn method, the significant feature of this method being that the glass sheet, as it is drawn upward from a shallow pot, is contacted and gripped at its edges by knurled rollers which maintain the sheet stretched transverse to the direction of draw. The sheet is then bent over a roll and well annealed in a long horizontal lehr. In the third such method in common use, frequently referred to as the Pennvernon method, a so-called draw bar is positioned in the molten glass pot immediately under the line of draw of the glass sheet. The top surface of the draw bar is of generally V-shaped cross section though any number of modified draw bar shapes have been proposed and used. The sheet is drawn and rough annealed vertically.

The debiteuse of the Fourcault system, the sheet edge contacting rollers and bending roll of the Colburn system, and the draw bar of the Pennvernon system all have a common function, namely, to maintain the drawn glass in sheet form of the desired width. The common advantage to all three of these methods is that of low manufacturing cost as compared, for example, with the metal-float system. However, all three of these conventionally used drawing methods have the common disadvantage of producing raw glass sheet of relatively low optical quality.

In order for glass sheet to be of high optical quality, it must have two characteristics. First, it must have extremely smooth surfaces and, secondly, it must be of very uniform thickness. In the practice of the Fourcault method, surface waves and thickness variations are caused by variations in viscosity, and it is impossible as a practical matter to attain smooth surfaces since any initial or developed roughness in the debiteuse slot is imparted to the surfaces of the glass sheet. In the Colburn system, the edges of the glass sheet, which are contacted by the gripping rollers, must be cut away and therefore constitute scrap. Another serious disadvantage is that the glass sheet between the gripping rollers is not of the desired uniform thickness and is instead wavy. The bending roll also imparts deformations into one surface of the soft glass in the Colburn system. In a similar manner, Pennvernon glass sheet drawn by the Pennvernon method is of non-uniform thickness across its width, a defect which is obvious to the layman's eye by reason of the resulting optical distortion.

Summarizing, at the present state of the art there is no glass sheet drawing method available for manufacturing sheet glass of high optical quality, i.e., sheet glass having the combination of uniform thickness and smooth surface finish. For this reason, present drawn glass sheet cannot be used where high optical standards must be met as, for example, for automotive vehicle windshields. In order to meet high optical standards, present drawn glass sheet must be further processed into plate glass, as by a polishing and/or grinding operation. This not only involves added expense but also detracts from the quality of the glass in other respects in that the polishing or grinding operation used to attain the uniform thickness and smooth surface finish inherently removes the surface skin of the sheet with a resultant reduction in strength. This is manifest from the fact that aside from optical properties, it is more difficult to attain optimum quality in tempering plate glass than in tempering glass sheet, the tempering operation by its nature being dependent upon the surface skin characteristics of the glass.

What is needed, therefore, is a low cost sheet drawing system for the manufacture of glass sheet which has the combination of smooth surface finish and uniform thickness. Accordingly, the principal object and feature of the present invention is to fulfill this need.

More specifically, the present invention has as one of its objects and features the provision of a glass sheet manufacturing method which is simple and inexpensive in operation, which imposes minimum limitations on choice of glass composition and the thickness of the drawn sheet, and yet which produces glass sheet of uniform thickness and smooth surface finish. Another and attendant object and feature of the present invention is to provide a glass sheet manufacturing apparatus which is simple in construction and therefore easily and inexpensively operated and controlled to manufacture glass sheet of high optical quality, and therefore requires a relatively low capital investment.

Briefly, these and other objects and features are accomplished in accordance with a preferred embodiment of the invention including a pair of spaced parallel rolls which are partially submerged or immersed in the molten glass bath in the drawing chamber. The rolls have smooth surfaces of a material which is not wetted by the molten glass. The rolls are rotated in opposite directions so that the immersed or submerged portion of each roll rotates toward the immersed or submerged portion of the other thereby to move molten glass upwardly from the molten bath between the rolls and into an elongated body of molten glass, hereinafter referred to as the "onion," which is disposed on the other side of the rolls from the molten bath between and adjacent the exposed surfaces of the rolls. The molten glass forming the onion is at a temperature somewhat below the temperature of the molten glass in the molten bath but remains high enough to fire polish the surface of the molten glass forming the onion and hence the sheet being drawn from the onion. The drawn sheet, after it has travelled sufficiently to harden, is contacted by drawing rollers which cause the sheet to be drawn from the onion, the drive mechanism which causes these drawing rollers to rotate being syncronized with the drive mechanism which causes the partially immersed rolls in the molten glass bath to rotate. Hence, the rate at which the sheet is drawn from the onion by the drawing rollers is synchronized with the rate at which the molten glass is fed into the onion from the molten glass bath by the partially immersed rolls. The elongated body of molten glass disposed between the exposed portions of rolls is, for simplicity, herein referred to as the "onion" for the reason that the transverse cross section of this elongated body of glass has a shape which approximates the cross section from bottom to top through an ordinary garden onion, i.e., a cross section with convex arcuate sides which change to concave arcuate sides toward the top of the body adjacent the juncture at the top of the body with the sheet being drawn from it. In other words, the onion has the approximate cross section of a bulb and is therefore bulbous. Because the partially immersed rolls are extremely smooth and are not wetted by the glass, the surface of the onion are quite smooth even adjacent the bottom of the onion where the molten glass leaves the surfaces of the rolls and is fed into the onion from between the rolls. The smoothness is even further enhanced, however, by the fire polishing and hence the sheet drawn from the onion has extremely smooth surfaces albeit the immersed rolls may have some surface irregularities. The temperature of the onion can be maintained sufficiently high for fire polishing and yet somewhat below the temperature of the molten glass in the bath surrounding the rolls, either by the normal cooling which occurs to the rolls by reason of the portions thereof exposed above the surface of the molten glass bath or by additional or other suitable cooling means such as the circulation of a heat transfer fluid through the interior of the rolls. This lowering of temperature as the glass moves from the bath into the onion allows the bath to be kept above the devitrification point. The glass in the onion is below the devitrification point but is formed into the sheet before devitrification can set in and none of the glass sticks to the rolls. In the other three sheet forming methods some of the devitrified glass always adheres to the debiteuse, drawing pot or draw bar, thus requiring costly periodic shutdowns to reheat and remelt the devitrified glass and start the drawing of sheet glass over again. In the instant invention, the molten glass, as it is moved from the bath into the onion, is slightly cooled by the rolls and since the glass during its movement into the onion is worked into a thin section between the rolls tending thereby to cause heat transfer and equalization of temperature within the glass, there can be greater uniformity of temperature (and hence viscosity) of the glass in the onion than that of the glass in the bath. Further, since the glass can be fed into the onion by the rolls at a uniform rate independent of localized differences in viscosity and since the glass once in the onion is precluded from flowing back into the bath because of the movement of the rolls, the glass has no choice, so to speak, but to move into the drawn sheet at a uniform rate in all portions across the width of the drawn sheet. Any slight difference in temperature, and therefore viscosity, in localized portions of the onion have little or no tendency to cause localized thinning of the sheet, any localized portions of less viscosity in the onion being carried into the drawn sheet by and at the same rate as adjacent more viscous portions of the glass in the onion. The combination of these factors results in a drawn sheet of highly uniform thickness. Hence, the method and apparatus of the instant invention attain the desired ideal combination of properties in the glass sheet, namely, smooth surface and uniformity of thickness. By adjusting the spacing and speed of the partially immersed rolls and the speed of the drawing rollers, any desired glass sheet thickness can be accomplished. Also, the method does not impose limitations on glass formulation and any of the conventional glass compositions currently used to make sheet glass can be used with the present invention.

Other objects, features and advantages of the invention will appear more clearly from the following detailed description of a preferred embodiment thereof made with reference to the drawings in which.

Figure 1:
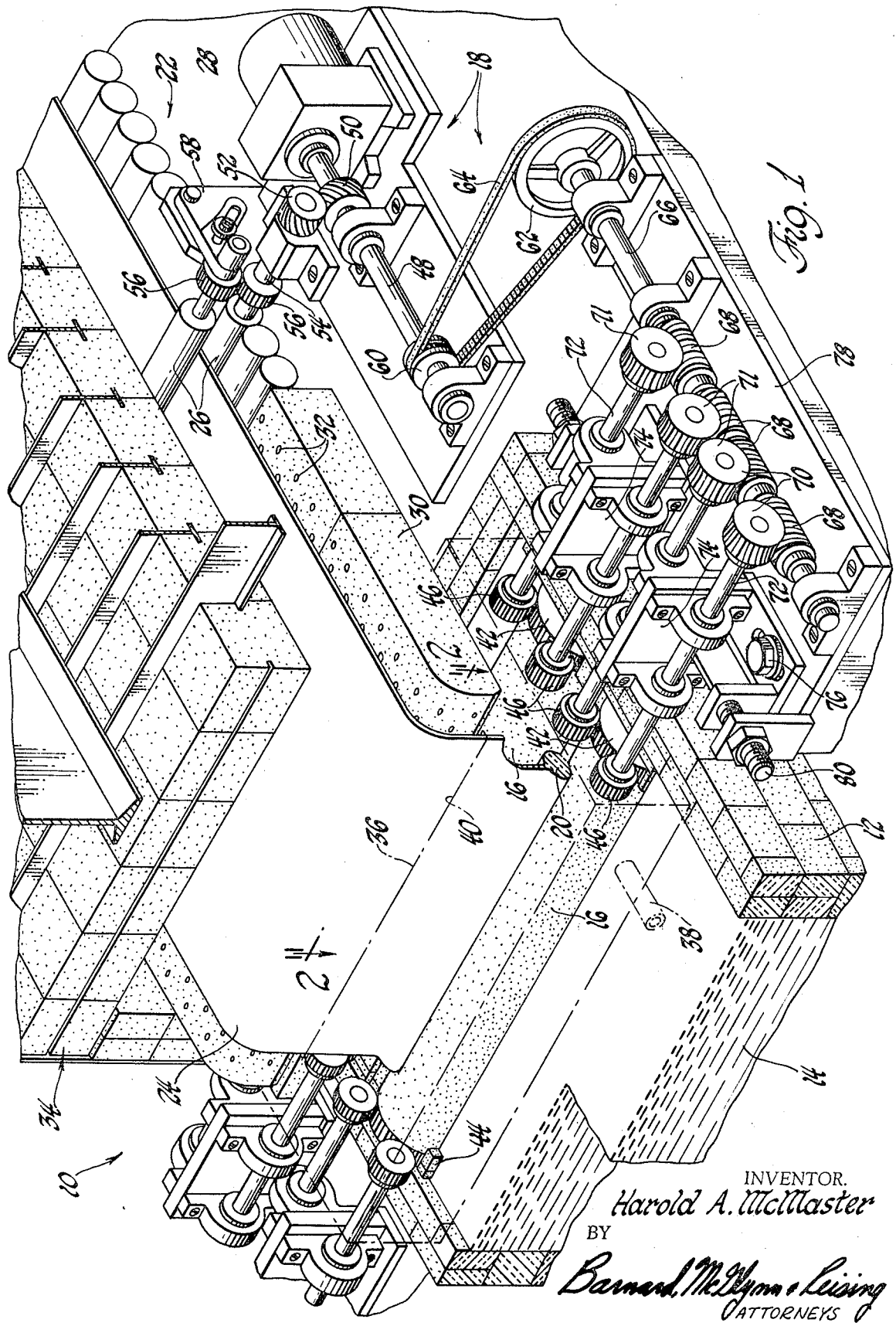
FIG. 1 is an isometric view of a preferred embodiment of the apparatus during its operation to produce glass sheet.
Figure 2:
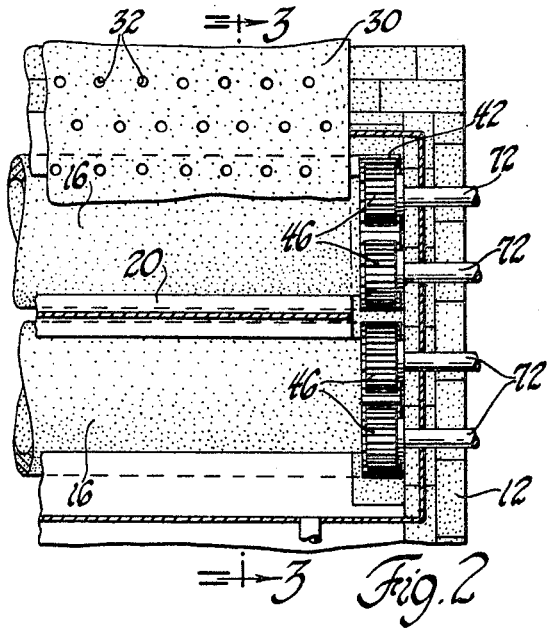
FIG. 2 is a fragmentary cross-sectional view taken along line 2—2 of FIG. 1.
Figure 3:
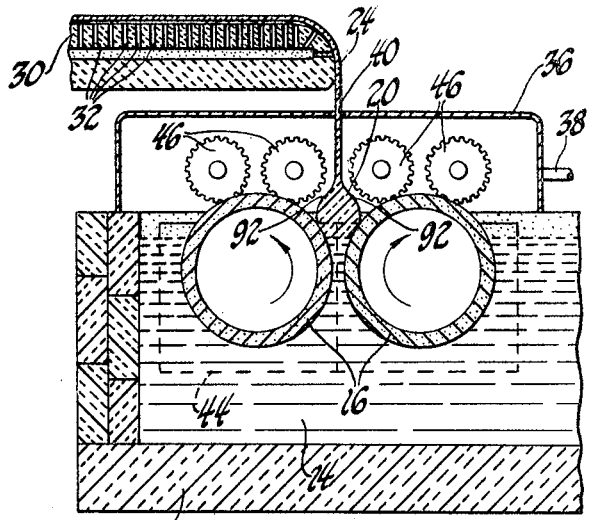
FIG. 3 is a fragmentary cross-sectional view taken along line 3—3 of FIG. 2.

Referring now to the drawings, wherein like numerals indicate like or corresponding parts throughout the several views, a preferred embodiment of the apparatus of the instant invention is generally shown at 10 in FIG. 1. The apparatus 10 includes the tank 12 for holding a molten glass bath 14. There is also included a pair of spaced elongated parallel cylindrical rolls 16 which are positioned in the tank 12 for partial immergence in the molten glass bath 14. The rollers 16 have smooth surfaces made of a material which is not wetted by the molten glass, such material preferably being graphite, boron nitride, molybdenum disilicide, or the like. There is also included a drive means, generally shown at 18. The drive means 18, as will be more clearly explained hereinafter, causes the rolls 16 to rotate in opposite directions as shown in FIG. 3 to cause molten glass to be moved between the rolls 16 and into the elongated body or onion 20 of molten glass. The elongated body or onion 20 is formed adjacent the portions of the rolls 16 which are exposed above the surface of the molten glass bath 14. There is also included drawing means, generally indicated at 22, for drawing the glass sheet 24 from the elongated body or onion 20.

The drawing means 22 includes roller members 26 for contacting the glass sheet 24 at a portion which is spaced from the elongated body or onion 20 so that the glass sheet has been cooled to below deformation temperature before being contacted by the drawing roller members 26, thus preventing the roller members 26 from marring the surface of the glass sheet 24. The drive means 18 imparts motion to the roller members 26 causing movement of the glass sheet 24. The drive means 18 includes a motor 28 for providing the power to rotate the rolls 16 and to rotate the rollers 26. The drive means 18 is operative to synchronize the motion of the roller members 26 with the motion of the rolls 16 so that the same amount of molten glass is moved from the bath 14 and into the elongated body or onion 20 as it is drawn from the elongated body or onion 20 and into the glass sheet 24. This is a very important feature of the instant invention.

There is also included a gas support means including the bed 30 for changing the direction of movement and for supporting the glass sheet 24 between the rolls 16 and the drawing roller members 26. The glass sheet 24 is drawn from the elongated body or onion 20 while still at deformation temperature and is caused to bend around a curved portion of the bed 30 to move in a horizontal direction while supported on gases being emitted from the holes or passages 32. The gases supplied through the passages 32 are hot but are sufficiently cool to reduce the temperature of the glass sheet 24 as it approaches the roller members 26. The glass sheet 24 does not contact the bed 30 but is instead supported in close spaced relationship to the bed by the blanket of hot gases being emitted from the passages 32. The hot gas being emitted from the passages 32 consists of combustion products of burned hydrocarbon gas which is fed to the interior of the bed 30 for exit through the passages 32. As illustrated, the bed is composed of separate juxtaposed sections which extend across the bed transverse the direction of movement of the glass sheet 24. This enables the temperature of the hot gas blanket to be varied along the bed in a direction of travel of the glass sheet 24 thereby to accomplish gradual cooling and annealing of the glass sheet 24 as it moves over the gas support bed. That is to say, the temperature of the hot gas fed to the bed in the section nearest the point at which the sheet of glass 24 changes direction is higher than the temperature of the hot gas fed to the bed at subsequent positions along the bed toward the roller members 26. It will be understood, of course, that any number of such gas support bed sections can be used in order to accomplish the desired control of cooling of the glass sheet 24 as it moves over the bed and toward the roller members 26.

In the embodiment shown the gas support bed 30 consitutes the bottom wall or floor of the lehr 34 through which the sheet of glass 24 moves while supported on the hot gas blanket. For efficiency, the hot gas within the lehr 34 and above the glass sheet 24 can be continuously withdrawn and recirculated through the gas support bed 30. Also, if desired, heated gases may be passed through the upper wall or ceiling of the lehr 34 to thereby control the uniform cooling of both the top and bottom surfaces of the glass sheet 24.

It will be understood that at some point beyond the roller members 26 the glass sheet 24 can be cut into lengths desired in accordance with the conventional practice.

The tank 12 can be made of conventional refractory construction and it will be understood that the portion of the tank 12 shown communicates with a melting pot or tank (not shown) where the molten glass is formulated and melted for continuous supply into the tank 12. During this supply, the surface or the level of the molten glass bath 14 is maintained relatively constant or at least within predetermined limits.

As alluded to above, the rolls 16 have extremely smooth surfaces, the smoother the better, and at least the surface of the rolls are of a material, such as graphite, which is not wetted by the molten glass. Graphite, when at a high temperature, is subject to oxidation when exposed to ambient atmosphere and since oxidation can by way of resulting errosion tend to roughen the rolls, it is desired to maintain a reducing or inert atmosphere about the rolls 16. Hence, a suitable refractory or heat resistant metal enclosure means 36 surrounds the rolls 16 for exposing the rolls 16 to a reducing or inert atmosphere. The enclosure means 36 is secured to the tank 12 in a position to enclose the rolls 16. A nonoxidizing gas, such as carbon dioxide, is flowed into the enclosure means 36 through the inlet conduit 38 to cause the enclosure means 36 to be filled with the non-oxidizing gas. A slot 40 in the top of the enclosure means 36 allows the exit of the glass sheet 24. The non-oxidizing gas can be continuously supplied to the interior of the enclosure means 36 to compensate for its slow escape through the slot 40.

Preferably, the rolls 16 are buoyant and float in the molten glass bath 14. A gear means 42 is disposed on each end of each of the rolls 16. A cap means 44 is supported by and is disposed about that portion of each of the gear means 42 which is disposed below the surface of the molten glass bath 14. The cap means 44 move with the rolls 16 and prevent the molten glass from engaging or being pumped by the gear means 42. The sheet 24 as it is drawn from the elongated body or onion 20 tends to be pulled inwardly toward the middle of the sheet and therefore there is little, if any, contact between the ends of the elongated body or onion 20 and the cap means 44. The rolls 16 are sufficiently buoyant to maintain the gear means 42 in positive driving engagement with the motion transmitting gear means 46 of the drive means 18.

The temperature of the molten glass in the elongated body or onion 20 is lower than the temperature of the molten glass in the bath 14, preferably the difference in temperature being at least 100° F. The inert atmosphere provided within the enclosure means 36 may cool the surfaces of the rolls 16 exposed above the surface of the molten bath 14; however, as an alternative, cooling fluid, either gas or liquid, may be passed through the hollow rolls 16 for cooling purposes.

As mentioned above, the drive means 18 includes a motor 28. The motor 28 rotates a shaft 48 which in turn has a gear 50 secured thereto. The gear 50 rotates the gear 52 which in turn rotates the shaft 54 and the intermeshing gears 56. The gears 56 are connected to and rotate the roller members 26 for drawing the sheet 24. The member 58 is adjustable to adjust the distance between the roller members 26 to allow for the drawing of different thicknesses of glass sheet. A geared pulley 60 is also attached to the shaft 48 and drives the geared pulley 62 through the notched driving belt 64. The pulley 62 rotates the shaft 66 and the worm gears 68 are secured to and rotated by the shaft 66. The worm gears 68 respectively engage and rotate the gears 70 and 71 in the direction of the arrows as indicated in FIG. 1. The gears 70 and 71 rotate the shafts 72 which in turn rotate the gear means 46. The shafts 72 are rotatably supported by the fixtures 74, the fixtures 74 being secured by the bolts 76 to the platform 78. The bolts 76 and adjustment screw 80 comprise an adjustment for adjusting the position of the gear means 46, which are in driving engagement with the rolls 16 through the gears 42, thereby to adjust the relative position between the rolls 16. Thus, the drive means 18 is operative to rotate the rolls 16 and the roller members 26 in a synchronized manner so that molten glass is fed into the elongated body or onion 20 at the same volume or amount as the glass is moved or drawn from the top of the elongated body or onion 20 and into the glass sheet 24 by the roller members 26.

Figure 6:
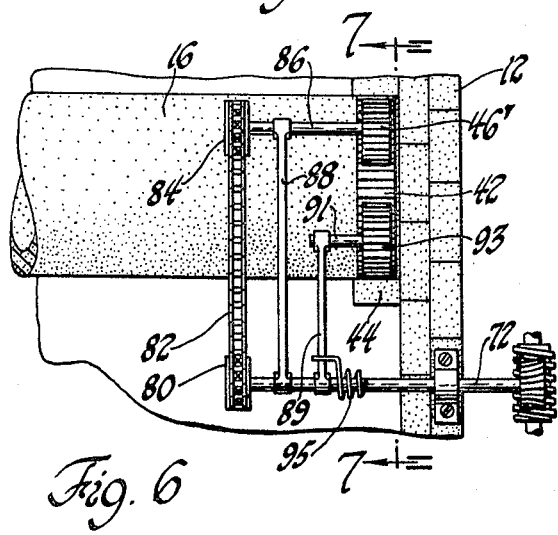
FIG. 6 shows an end view of an alternative drive means for the rolls.
Figure 7:
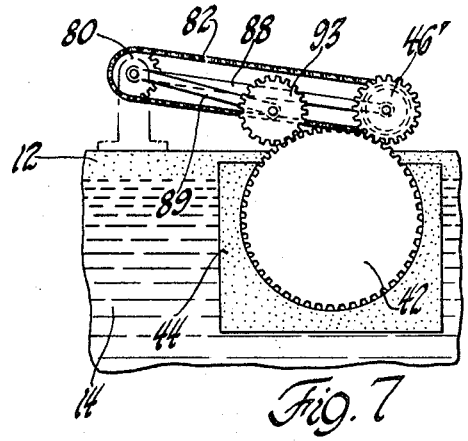
FIG. 7 is a cross-sectional view taken substantially along line 7—7 of FIG. 6.

It is desirable that the level or surface of the molten glass bath 14 relative to the rolls 16 (in other words, the extent of immersion of the rolls 16 in the molten glass bath 14) remain constant or at least within close tolerances. This can be accomplished by securing the rolls 16 for rotation in the tank 12 at a fixed level and then closely controlling the level or surface of the molten glass bath 14 so that the surface of the molten glass bath 14 is always at the same level relative to the rolls 16. The same may be accomplished by the alternative embodiment disclosed in FIGS. 6 and 7 wherein the rolls 16 always float at the same level with respect to the surface of the molten glass bath 14 regardless of the level of the surface of the molten glass bath 14. As disclosed in FIGS. 6 and 7, the drive means 18 includes motion transmitting gear means 46' for contacting and driving the rolls 16 by engaging the gears 42, yet allowing the rolls 16 to move vertically. Thus, the relative position between the surface of the molten glass bath 14 and the rolls 16 remains substantially constant as the rolls are rotated. More specifically, the shaft 72 rotates a gear 80. The gear 80 moves a chain 82 which in turn rotates a gear 84, the gear 84 being secured to the shaft 86. Also secured to the shaft 86 is a motion transmitting gear means 46'. A lever or link 88 is rotatably disposed on the shaft 72 and rotatably supports the shaft 86. Thus, as the gear means 46' is in driving engagement with the gear 42 and the roller 16 moves vertically, the lever 88 rotates about the axis of the shaft 72 while the gear means 46' remains in driving engagement with the gear 42. A second lever or link 89 is rotatably supported on the shaft 72 and supports the shaft 91. The gear 93 is rotatable on the shaft 91 and engages the gear 42 so that the gear 42 remains between the gears 46' and 93. The spring 95 urges the gear 93 into engagement with the gear 42. Thus, the rolls 16 are allowed to move up and down vertically as they float on the molten glass bath 14 yet the driving gears 42 are in constant motion transmitting engagement with the gear means 46'.

Figure 4:
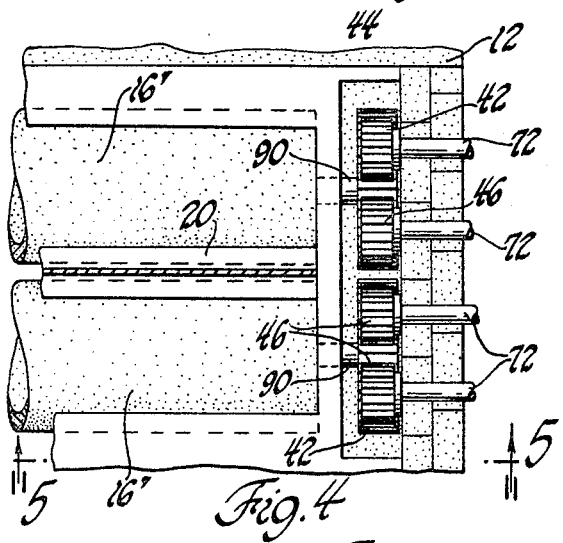
FIG. 4 is a cross-sectional view similar to FIG. 2 but showing an alternative embodiment of the instant invention.
Figure 5:
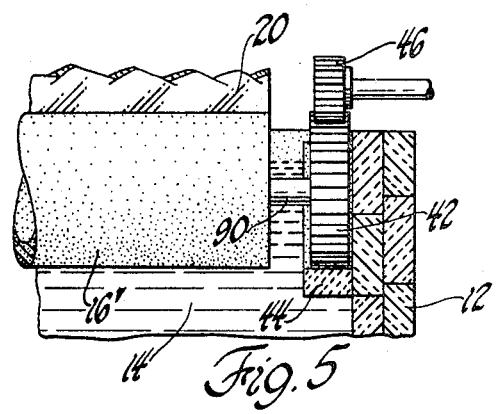
FIG. 5 is a cross-sectional view taken along line 5—5 of FIG. 4.

An alternative embodiment is disclosed in FIGS. 4 and 5. In the embodiment of FIGS. 4 and 5, the rolls 16' include a portion 90 of reduced diameter adjacent each end thereof to prevent imparting motion to molten glass from the bath 14. In other words, the reduction of the diameter of the rolls 16' as indicated at 90 prevents the movement of liquid or molten glass upwardly thereby preventing the formation of the elongated body or onion 20 above the reduced portion 90 of the rolls 16'. This provides very discrete and exact control of the width of the sheet 24 being drawn from the elongated body or onion 20.

As best illustrated in FIG. 3, the elongated body or onion 20 has convexly curved exposed side surfaces 92. It will be noted, therefore, that the molten glass is moved from the relatively large body of molten glass formed by the bath 14 and into the elongated body or onion 20 by the engagement of the rolls 16 at an intermediate portion of the molten glass mass to impart movement of the molten glass toward the elongated body 20. More specifically, the rolls 16 form concave side surfaces in the intermediate portion of the molten glass mass, i.e., that portion of the molten glass mass disposed between the rolls 16. Although the temperature of the molten glass in the elongated body or onion 20 is less than the temperature of the glass in the molten bath 14, the temperature of the elongated body or onion 20 is maintained sufficiently high to cause fire polishing of the exposed surfaces thereof. In other words, fire polishing occurs in the surfaces 92 of the elongated body or onion 20. This is very important because the sheet being drawn therefrom will have a uniform thickness, a fire polished surface and since it is supported on hot gases over the bed 30 and cooled before reaching the drawing roller members 26, the resultant sheet of glass has extremely high optical qualities. It is important, therefore, that the same amount of molten glass be moved into the elongated body or onion 20 as is moved out of the elongated body or onion 20 and into the sheet 24 drawn therefrom. If such is not maintained, molten glass will be carried by the rolls 16 on the exposed portion thereof and back into the molten glass bath, i.e., wetting of the rolls, which in turn prevents the production of a sheet having uniform thickness and highly smooth or fire polished surfaces. To accomplish the fire polishing, the molten glass is maintained in the elongated body or onion 20 for approximately 10 to 100 seconds for ¼ inch thick glass. Of course, the smoother the surface of the rolls 16, the less necessity there is to fire polish. Therefore, the thickness of the elongated body 20 may decrease when formed by rolls 16 having smoother surfaces. It is essential to note, however, that the rolls 16 are not wetted by the molten glass and therefore all of the glass moved into the elongated body 20 is simultaneously drawn therefrom. Assuming a sheet having a ¼" thickness is being drawn and that the minimum distance between the rolls 16 is 1" (one inch), the velocity at which the sheet is drawn must be four (4) times the velocity imparted to the molten glass by the rolls 16 at the minimum distance between the rolls, i.e., at the minimum thickness of the molten glass between the rolls 16. The roll 16, therefore, continuously moves portions of a continuous mass of molten glass from a relatively large body 14 by imparting a first velocity thereto at a first thickness, which is the minimum thickness between the rolls 16, to form a relatively small elongated body 20 having a predetermined thickness. Simultaneously all of the molten glass moved into the elongated body 20 by the rolls 16 is drawn therefrom and into a sheet 24 having a thickness less than the thickness of the elongated body 20 by drawing the sheet 24 at a velocity which is greater than the velocity imparted to the molten glass by the rolls 16 at the minimum distance therebetween. Thus, it is important to maintain the ratio of the velocity of the sheet over the velocity imparted to the molten glass by the rolls equal to the ratio of the minimum thickness of the molten glass between the rolls over the thickness of the sheet.

It will be understood that whereas in the preferred embodiment, the glass sheet 24 is first moved vertically upward and then is caused to move horizontally while being supported on gases, the glass sheet can, if desired, be drawn continuously vertically upwardly until contacted by the drawing roller members, after which the glass sheet may be cut into separate sheets of the desired length. In some environments, the sheet may be drawn vertically upward and then over a bending roll for movement horizontally. Such a bending roll is well known in the abovementioned Colburn system. Also, rolls or knurls as frequently utilized in the Colburn system may be utilized with the instant invention for engaging the edges of the drawn sheet immediately above the rolls 16 for accurately controlling the width of the drawn sheet.

The invention has been described in an illustrative manner and it is to be understood that the termnology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A method for manufacturing glass sheet comprising; engaging a large body of molten glass with roller means to continuously move portions of the molten glass into an elongated body over the roller means, simultaneously drawing a glass sheet from said elongated body by applying a force to the sheet at a position remote from the elongated gated body, and establishing a relationship between the rotation of said roller means and the drawing speed for maintaining the elongated body as an enlarged body having convexly curved exposed side surfaces from which the sheet is drawn.

2. A method as set forth in claim 1 including maintaining the temperature of said elongated body below the temperature of said large body.

3. A method as set forth in claim 2 including maintaining the temperature of said elongated body of molten glass sufficiently high to cause fire polishing of the surfaces of said elongated body.

4. A method as set forth in claim 1 including maintaining the temperature of the glass in said large body sufficiently high to prevent devitrification of said glass.

5. A method as set forth in claim 4 including drawing all glass from the elongated small body and into the sheet before the glass begins to divitrify.

6. A method as set forth in claim 2 including constantly maintaining the amount of the molten glass moved into said elongated body equal to the amount of molten glass moved out of the elongated body and into the glass sheet drawn therefrom; and maintaining the molten glass in said elongated body for about 10 to 100 seconds as it moves from said large body, into said elongated body, and then into the glass sheet drawn therefrom.

7. A method as set forth in claim 1 further defined as drawing the sheet from said elongated body by applying the force to and contacting only a portion of the sheet which is spaced from the elongated body and which has been cooled to below deformation temperature.

8. A method as set forth in claim 1 including maintaining the molten glass in said elongated body for about 10 to 100 seconds as it moves from said large body, into said elongated body, and then into the glass sheet drawn therefrom.

9. A method as set forth in claim 1 including supporting portions of said sheet intermediate the elongated body and the contacted portion of said sheet on gas.

10. A method as set forth in claim 1 including moving the glass sheet vertically as it is drawn from said elongated body and then changing the movement of said sheet to horizontal while still at deformation temperature and supporting said sheet on gas.

11. Apparatus for the manufacture of glass sheet consisting of; a tank for holding a molten glass bath, a pair of spaced elongated parallel cylindrical rolls positioned in said tank for partial immersion in said molten glass bath, means on said rolls for providing a non-wetting surface on said rolls by said molten glass, drive means for causing said rolls to rotate in opposite directions to cause molten glass to be moved between said rolls and into an elongated body of glass adjacent the portions of the rolls exposed above the surface of the molten glass bath, drawing means for drawing a glass sheet from said elongated body, gas support means disposed between said elongated body and said drawing means for changing the direction of movement of the glass sheet from vertical to horizontal and supporting the glass sheet on gas.

12. Apparatus as set forth in claim 11 wherein said rolls are bouyant and float in said molten glass bath.

13. Apparatus as set forth in claim 12 wherein said drive means includes motion transmitting means for contacting and driving said rolls as said rolls move vertically whereby the relative position between the surface of the molten glass bath and said rolls remains substantially constant as said rolls are rotated.

14. Apparatus as set forth in claim 11 wherein said rolls include a portion of reduced diameter adjacent each end thereof to prevent imparting motion to molten glass from the bath thereat.

15. Apparatus as set forth in claim 11 including cooling means for cooling said rolls.

16. Apparatus as set forth in claim 11 including enclosure means surrounding said rolls for exposing said rolls to an inert atmosphere.

17. Apparatus as set forth in claim 11 including adjustment means to adjust the position of that portion of said drive means in driving engagement with said rolls to adjust the space between said rolls.

18. Apparatus as set forth in claim 11 including gear means at least at one end of each of said rolls and cap means supported by and disposed about at least that portion of said gear means which is to be disposed below the surface of the molten glass bath.

19. Apparatus as set forth in claim 11 wherein said drawing means comprises members for contacting glass sheet at a portion thereof which is spaced from said elongated body so that the glass sheet has been cooled to below deformation temperature before being contacted by said drawing means, said drive means imparting motion to said members for causing movement of the glass sheet, said drive means being operative to synchronize the motion of said members with the motion of said rolls so that the same amount of molten glass is moved from said bath and into said elongated body as is drawn from said elongated body and into said glass sheet.

References Cited

UNITED STATES PATENTS

| | | | |
|---|---|---|---|
| 941,866 | 11/1909 | Fourcault | 65—90 |
| 1,807,873 | 6/1931 | Reece et al. | 65—198 X |
| 2,478,090 | 8/1949 | Devol | 65—182 X |

ARTHUR D. KELLOGG, Primary Examiner

U.S. Cl. X.R.

65—84, 92, 95, 182, 194, 196, 198